Oct. 14, 1924. 1,511,317
F. E. V. BEANES
TOOL FOR USE BY SMOKERS
Filed Nov. 5, 1921  2 Sheets-Sheet 1

INVENTOR
F. E. V. Beanes
by
Hubert A. Gill
Attorney.

Oct. 14, 1924.                                           1,511,317
F. E. V. BEANES
TOOL FOR USE BY SMOKERS
Filed Nov. 5, 1921          2 Sheets-Sheet 2
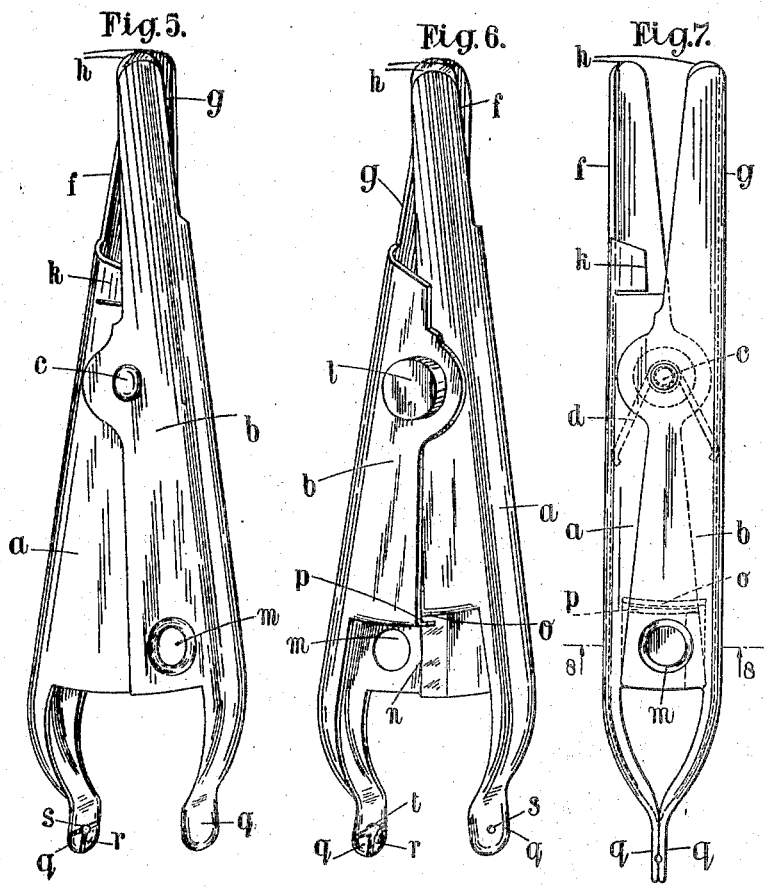
INVENTOR
F. E. V. Beanes.
by
Hubert A. Gill
Attorney

Patented Oct. 14, 1924.

1,511,317

UNITED STATES PATENT OFFICE.

FREDERICK E. V. BEANES, OF LONDON, ENGLAND.

TOOL FOR USE BY SMOKERS.

Application filed November 5, 1921. Serial No. 513,158.

*To all whom it may concern:*

Be it known that I, FREDERICK EDWARD VESEY BEANES, a subject of the King of Great Britain, and resident of Falcon Works, Wallis Road, Hackney Wick, London, E. 9, England, have invented certain new and useful Improvements in Tools for Use by Smokers (for which I have filed patent applications in England, dated August 5th, 1921, September 1st, 1921, and September 23rd, 1921, respectively), of which the following is a specification.

This invention relates to tools primarly designed for use as scrapers or reamers for the bowls of tobacco pipes, although the tools according to the invention may be adapted also to serve other purposes such as the cutting of cigar ends, the opening and fastening of the lids of cigar boxes, and so forth. It is the principal object of the invention to provide a tool which shall be expansible to any required diameter for scraping or cutting purposes, while it can be manipulated easily by means of handles which open out the blades as such handles are pressed together. The tool is designed to operate with a true cutting action in cleaning out a pipe bowl, as distinct from the scraping action such as is produced by radial blades or burrs commonly formed on reamers for pipes. Further objects of the invention are to combine with a pipe scraping tool means for serving other purposes, including a blade and socket useful for cutting cigar ends, spatula-shaped ends on the handles for use in opening box lids such as those of cigar boxes, a hole and recesses being provided if desired in such spatula-shaped ends of the handles in order to assist in removing and re-inserting if required the nails or brads by which box lids are secured. Another object is to provide the tool with a head which can be used as a hammer.

The invention is illustrated in the accompanying drawings, wherein:—

Figure 5 shows a second form of the tool in perspective view;

Figure 6 shows the tool of Figure 5 as seen from the opposite side;

Figure 7 is a side view of the tool of Figure 5, with the blades opened out; and Figure 8 shows a section on the line 8—8 of Figure 7 looking in the direction of the arrows.

Figures 9 to 12 are partial perspective views hereinafter described, illustrating specific uses of the tool as shown in Figures 5 to 8.

Figure 1:
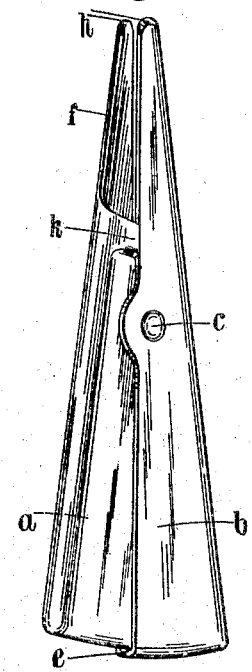
Figure 1 shows one form of the tool in perspective view.
Figure 2:
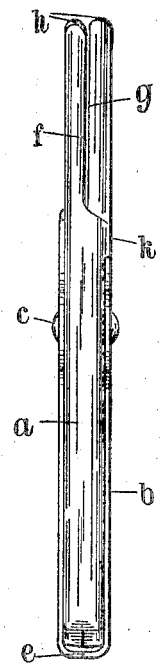
Figure 2 shows the same tool in edge view.
Figure 3:
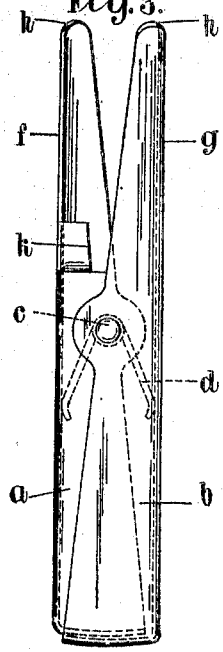
Figure 3 shows a side view of the same tool with the blades opened out.
Figure 4:
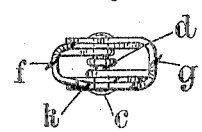
Figure 4 shows a plan of Figure 3 looking from the blade ends.

Referring first to Figures 1 to 4, the tool there shown consists of two parts $a$, $b$, stamped out of sheet metal to a channel section so that the one part $a$ will fit into the other part $b$, while the parts are pivotally connected by a rivet $c$. Around this pivot is fitted a spring $d$, the arms of which bear inside the handle portions of the parts $a$, $b$, as seen in dotted lines in Figure 3. The ends of the handle portions are preferably closed in by bending over the sheet metal to meet on a centre line as at $e$, Figure 2, leaving no sharp corners which might hurt or nip the skin of the hand in gripping and manipulating the tool. The channel section of the parts $a$, $b$, is half cut away to form blades with cutting edges at $f$ and $g$ beyond the pivot $c$, the ends of the blades being preferably rounded as at $h$. In the free position of the tool, as in Figure 1, the handle end of the tool is expanded by the action of the spring $d$ as far as is permitted by a lug $k$ bent up from the member $a$ and bearing against the side of the member $b$, while the blades are closed toward one another. When the tool is to be used, the blades are inserted into the bowl of the pipe from which the charred matter is to be cut out, and the handle ends are gripped together to the required extent to spread the blades apart, whereupon the tool is turned round in the bowl (or this latter is turned with respect to the tool), while the pressure on the handles keeps the blades pressed outwardly until the bowl has been cleared out to the required extent. The blades will cut out the solid matter right down to the bottom of the bowl, and in fact will also remove between them the last traces of unburnt tobacco from the bottom, leaving the smoke passage clear. In this respect the tool differs radically in its action from burrs or reamers such as have commonly been used hitherto, because these have a rounded end which usually does not scrape out the material at all, but rather tends to pack it down tightly at the bottom of the pipe bowl, rendering it necessary to use a knife or other tool afterwards to clear out the bottom of the pipe bowl. The edges $f$, $g$, of the blades are sharpened with a backward rake as seen in Figure 4, so that they exert a true cutting action, and they remove the charred matter quickly and evenly from the bowl, while as the degree of the opening apart of the blades is varied by the extent to which the handle members are gripped together, the tool is adapted for use in cleaning out bowls of all sizes and shapes.

Referring now to Figures 5 to 8, the tool there shown is so formed as to serve other functions in addition to those of a pipe scraper. The two principal parts of the tool marked $a$ and $b$ to correspond with Figures 1 to 4, are connected by a rivet $c$ with a spring $d$ working around the same, while the blades are formed as before with cutting edges $f$, $g$, and with rounded ends $h$. The stop $k$ also serves the same function as in Figures 1 to 4. One end of the rivet $c$ is now formed with an enlarged head $l$ adapted to serve as a hammer. The handle part $b$ has a hole in it at $m$, preferably formed with bevelled edges as shown, and the other handle part $a$ is formed with a cutting edge as at $n$ which passes across the hole $m$ when the handle parts are pressed together toward the position of Figure 7, so that a cigar end inserted at the hole $m$ is effectively cut off. In order to prevent such severed cigar ends from entering the space between the channel members $a$ and $b$ and possibly interfering with the action of the spring $d$ for example, the sides of the members $a$, $b$, opposite to those on which the hole $m$ and blade $n$ are formed, are preferably turned inwardly as at $o$, $p$, so that the inwardly turned portions will move the one over the other, and will prevent any cigar ends or the like from passing the same.

The ends of the handle members are extended as shown and flattened out to form spatulas $q$ which may be sharpened to any required extent at their edges so that either of them can be forced beneath the lid of a box such as $u$, Figure 9, in order to enable it to be prised open. Both of the spatula ends preferably have transverse and longitudinal grooves in their inner faces as indicated at $r$, while the one end $q$ has a hole $s$ where the grooves cross and the other has a recess or depression $t$. The object of these parts is as follows:—

When a box lid $u$ held by a nail or brad $v$ has been opened, this nail will be left projecting from the lid and it may be desired to remove it. If so, the nail is caused to pass through the hole $s$ of one spatula end and into depression $t$ of the other, as indicated in Figure 10. Then the lid $u$ is pressed down while the point of the nail $v$ is held in the depression $t$ so that it cannot slip laterally, and the hole $s$ guides the nail so that it must become forced out straight from the lid, as in Figure 11. The projecting nail $v$ can then be gripped between the spatula ends $q$ and removed entirely. For replacement, it can be gripped between the ends $q$, with its head in the hole and recess $s$ and $t$, and its shank in the transverse or longitudinal grooves $r$, whereupon it is easily pressed into the box to the required extent as in Figure 12, and can be hammered down if required by the use of the head $l$ of the rivet $c$.

Having thus described my invention what I claim as new and desire to secure by Letters Patent is:—

1. A tool adapted to be used as a scraper for the bowls of tobacco pipes, said tool comprising two members and a pivot connecting the same, each of said members being of rounded channel shape and the end of each beyond the pivot having approximately half the rounded channel section cut away so as to form a blade with a sharp edge with a backward rake at the salient edge of each blade extending to the extremity or tip of each blade.

2. A tool adapted to be used as a scraper for the bowls of tobacco pipes, said tool comprising two members and a pivot connecting the same, each of said members being of rounded channel shape one wider than the other such that the one member can slide within the other, the end of each of said members beyond the pivot being cut away in such a manner as to provide a blade with a sharp edge having a backward rake which extends to the extremity or tip of each blade so that a single continuous sharp edge serves to cut deposit from the side of the tobacco pipe as well as the bottom of the pipe bowl, the members being formed and connected by the pivot in such manner that gripping together the handles will cause the blade portions to spread apart.

3. A tool adapted to be used as a scraper for the bowls of tobacco pipes, said tool comprising two members, a pivot connecting the same and a spring encircling said pivot and engaging said two members, each of said members having one portion formed as a handle and another portion on the other side of the pivot formed as a blade, the members formed and connected by the pivot in such a manner that gripping together the handles will cause the blade portions to spread apart, the blade portion of each member being formed by cutting away the member so as to leave approximately half of the rounded channel section and to form a single cutting edge extending to the extremity or tip of the blade serving to cut deposit from the side of the pipe bowl as well as from the bottom portion of the pipe bowl.

4. A tool adapted to be used as a scraper for the bowls of tobacco pipes, and said tool comprising two members formed to a channel shape for a portion of their length, and one of which is adapted to form a working fit in the channel of the other, a pivot connecting said members, a spring tending to press apart the members at one side of the pivot where said members constitute handles adapted to be gripped in the hand, said members at the other side of the pivot being formed as blades and so disposed that the blades are opened out in proportion as the handles are gripped together, an aperture in the one handle and a cutting edge on the other handle adapted to pass across said aperture when the handles are gripped together, the sides of the channel-shaped members opposite to those at which said aperture and said cutting edge respectively are formed, being turned inwardly in such manner that one inwardly-turned part overlaps the other, such overlapping occurring in a position nearer to said pivot than said aperture, whereby cigar ends cut off at said aperture are excluded from access to the space between the channel members near to the pivot.

FRED. E. V. BEANES.